May 10, 1932. W. J. LEMENTY 1,858,096
ANIMAL TRAP
Original Filed June 17, 1929 2 Sheets-Sheet 1
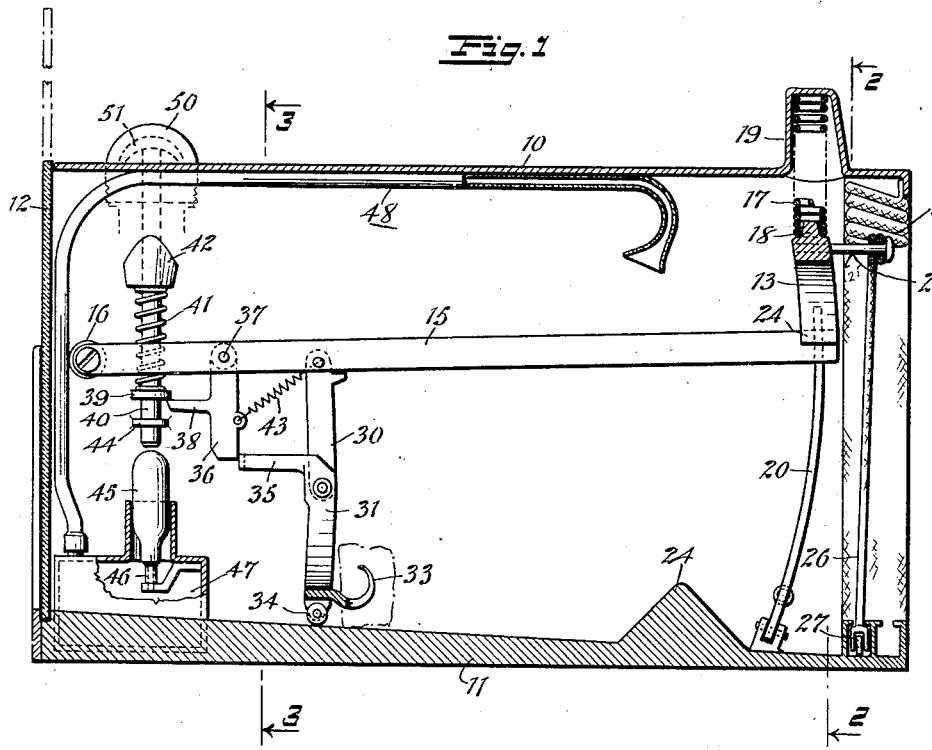
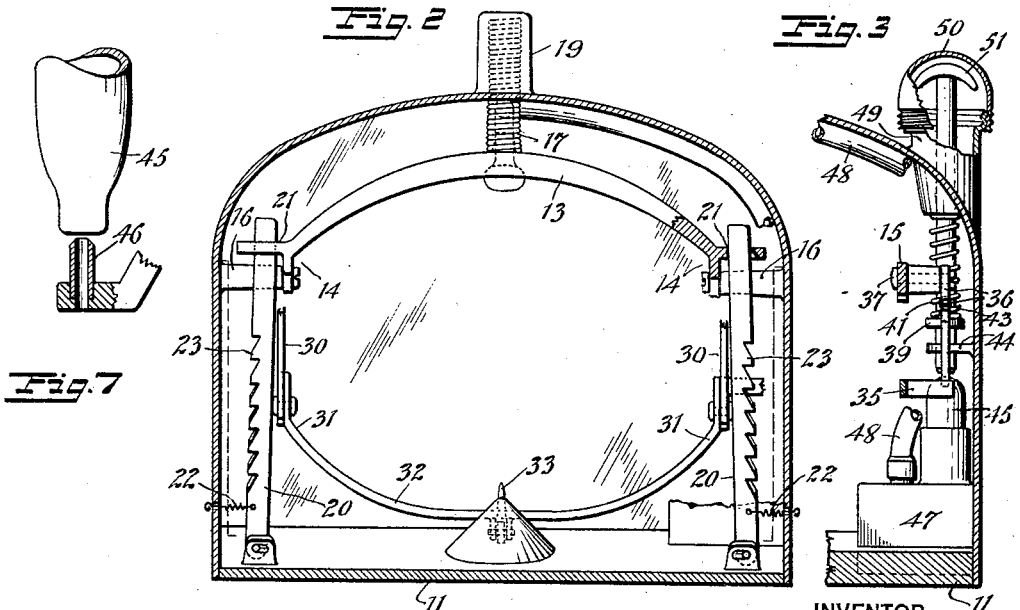
WITNESSES
Frank M. Pratt
A. T. Sperry
INVENTOR
Walter J. Lementy
BY Munn & Co.
ATTORNEYS May 10, 1932.  W. J. LEMENTY  1,858,096
ANIMAL TRAP
Original Filed June 17, 1929  2 Sheets-Sheet 2
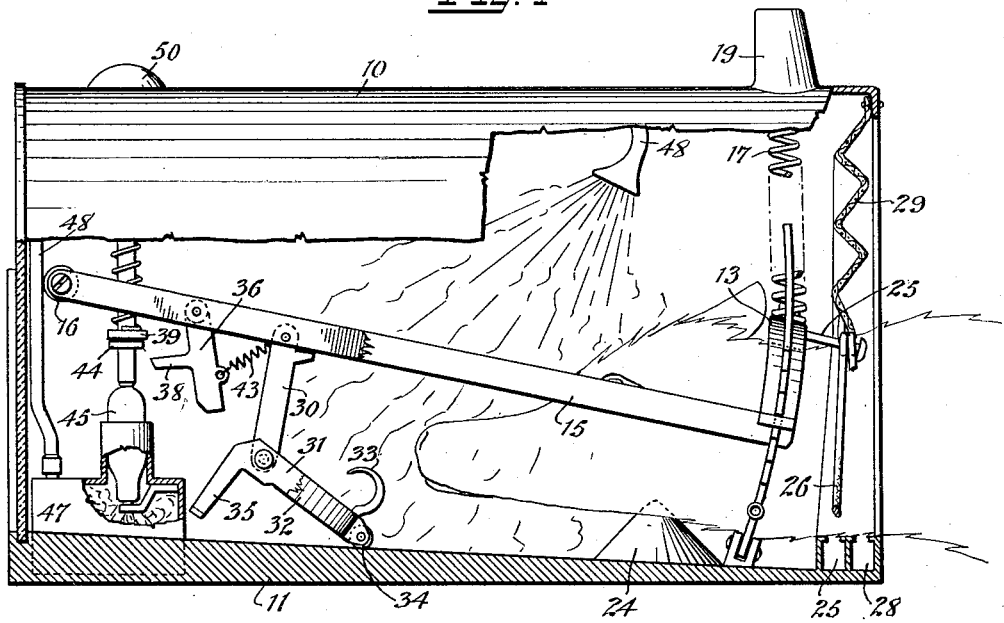
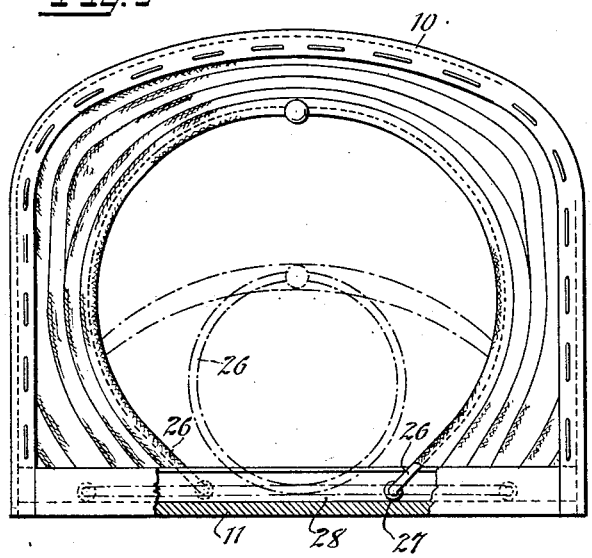
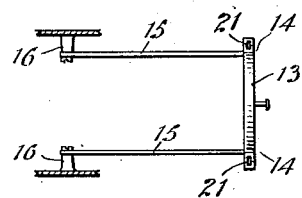
WITNESSES
INVENTOR
Walter J. Lementy
BY
ATTORNEYS Patented May 10, 1932

1,858,096

UNITED STATES PATENT OFFICE

WALTER J. LEMENTY, OF NEW YORK, N. Y.

ANIMAL TRAP

Application filed June 17, 1929, Serial No. 371,624. Renewed October 10, 1931.

This invention relates to animal traps.

It is among the prime objects of the present invention to provide an animal trap which will ensnare an animal without danger of injury to the hide or pelt of the animal.

A further object of the present invention is to provide a novel and improved animal trap which is adapted to cause the death or temporary insensibility of the animal by asphyxiation.

A further object of the present invention is to provide an animal trap which includes novel and improved means for securing in a hermetically sealed manner the head of the animal within a trap body.

A further object of the present invention is to provide in conjunction with the head-securing means, means operable thereby to discharge an asphyxiating gas within the body of the trap, whereby the animal will be speedily and painlessly dispatched without injury to the fur of the animal.

In conjunction with the foregoing prime objects, it will be understood that numerous other objects of the present invention are contemplated, such as the combination and interrelation of parts whereby the whole forms a simple, efficient and economic structure for the entrapping and dispatching of animals in a humane manner without injury to the fur of the animal.

Other objects and features of the present invention will be apparent from a consideration of the following specification taken in conjunction with the accompanying drawings, in which Figure 1 is a longitudinal vertical section illustrating one embodiment of the present invention;

Fig. 2 is a sectional view taken on lines 2—2 of Fig. 1;

Fig. 3 is a partial sectional view taken on lines 3—3 of Fig. 1;

Fig. 4 is a side elevation partly broken away of the device in entrapping position;

Fig. 5 is a front plan view of the device partly broken away;

Fig. 6 is a plan view illustrating the mounting of the animal engaging arms;

Fig. 7 is a detail view of the gas cartridge and discharging means therefor.

In connection with the present invention, it will be readily seen that the device provides for the trapping of fur-bearing animals without injury to the fur of the animal and without the inhuman treatment to which the animal would be subjected in the animal steel trap now used. The device may by selection of the asphyxiating gas used, be arranged for either the immediate dispatch of the animal or for a temporary insensibility. In either instance, the animal will suffer no pain and no wounds will be inflicted which will be painful or cause injury to the fur of the animal.

It will be understood in connection with the present invention, that only one preferred embodiment thereof is illustrated and that the invention is not confined to this specific embodiment nor to the materials specified or to the gas or gases herein mentioned.

The invention broadly contemplates a trap for the securement and either temporary or permanent asphyxiation of the animal, and it is not, therefore, confined to the specific construction as herein depicted by way of illustration.

Referring more particularly to the drawings, the embodiment of the invention herein illustrated includes a body 10, having a floor 11, a rounded top and depending side walls. The rear of the body 10 is normally closed by a glass or other transparent end wall 12, which may be removed by a vertical movement as indicated by the dotted lines in Fig. 1, to permit discharge of gases from the body. When the trap is in "set" position, the forward end of the body is open and the animal may have unobstructed vision through the trap.

For securing the head of the animal within the body 10, an arcuately shaped yoke 13 is provided, the extremities of which are joined as at 14, to a pair of rearwardly extending supporting arms 15, which are pivotally mounted on the sides of the body 10 adjacent the rear wall as at 16. In "set" position, the arms 15 are adapted to retain the yoke 13 in vertically raised position, as shown in Figs. 1 and 2, against the tension of a spring 17, which is received over a projecting portion 18 of the yoke and partially within an extended housing 19 on the top of the body 10.

For preventing accidental or unauthorized upward movement of the yoke 13 after downward movement thereof under the influence of the spring 17, when the arms 15 have been released as will be hereinafter described, a pair of pivotally mounted vertical rack bars 20 are provided adjacent the front opening of the trap. The rack bars 20 are receivable through apertured projecting ears 21 of the yoke 13, the outer face of the racks being urged against the outer edge of the aperture through the medium of springs 22, the arrangement being such that upon release of the arms 15, the yoke 13 moves downwardly under the influence of the spring 17 and the ears 21 pass downwardly over the rack bars 20, the notches 23 of which permit free downward movement of the yoke but restrict upward movement until the bars are moved inwardly against the tension of the springs 22.

For engaging the head of the animal within the body to prevent rearward movement of the head after the trap has sprung and to prevent excessive strain upon the yoke 13, the floor 11 is provided with an upwardly extending conical engaging member 24 which is adapted to be received between the sides of the lower jaw bone of the animal and gently but firmly secure the head against rearward movement, it being understood that upward movement of the head is prevented by action of the rack bars 20 which retain the yoke in its downward position until manual release thereof.

For hermetically sealing the head of the animal within the body of the trap when the yoke moves downwardly, the central portion of the yoke is provided with a forwardly extending pin 25 which engages the extremities of a pair of opposite outwardly and downwardly extending flexible closure members 26, the opposite extremities of which are preferably bifurcated to receive anti-friction rollers as at 27, and are mounted within trackways 28 which secure and guide the members therein for transverse movement across the floor 11 of the body 10. Associated with the members 26, a gas-tight curtain 29 is provided, which when the trap is in "set" position, is held by the closure members 26 in folded position adjacent the sides of the front opening and when the yoke 13 descends the closure members 26 move inwardly on the tracks 28 and pass each other as shown in the dotted-line position in Fig. 5, whereby the curtain 29 is drawn snugly about the neck of the entrapped animal, thus hermetically sealing the head of the animal within the trap body.

For permitting the animal to release the arms 15 when the animal head is properly within the body, the arms are provided with a pair of oppositely arranged depending arms 30 which receive for pivotal support the extremities 31 of an arcuately shaped bait holder 32, which includes a central bait hook 33 under which a roller 34 is mounted for contact with the floor 11 of the body. In Figs. 1 and 4, the arrangement is such that with the arms 30 and the holder 32 arranged in a vertical plane, as shown in Fig. 1, the arms 15 will be held in raised position against the tension of the spring 17. Upon forward movement of the arm 30, which may be initiated by the seizure of the bait by the animal, the roller 34 easily moves downwardly along the forwardly inclined rear portion of the floor 11, thus breaking the vertical support of the arms 15 and permitting the spring 17 to move the same downwardly to the engaged position shown in Fig. 4.

For releasing an asphyxiating gas within the chamber simultaneously with the downward movement of the yoke 13, one extremity of the bait holder 32 is rearwardly turned to provide a locking member 35, which when the trap is in "set" position, is adapted to abut the extremity of a pivoted dog 36. The dog 36 is pivotally mounted upon one of the arms 15 as at 37 and includes a right-angularly disposed pawl 38 which when the trap is in set position, is adapted to engage under a flange 39 carried by a plunger 40 which is normally urged downwardly by a surrounding spring 41, the lower end of which abuts the flange 39, while the upper end rests upon an inwardly extending housing portion 42 of the body 10. For pivotally moving the dog 36 to release the flange 39 when the bait is moved, a spring 43 is connected thereto and extends to the arm 15, the arrangement being such that with the forward movement of the bait holder 32, as shown in Fig. 4, the locking member 35 will be moved downwardly out of engagement with the dog 36, which through the tension of the spring 43, will move to the position shown in Fig. 4, thus releasing the flange 39 and permitting it to move downwardly with the plunger 40 to which it is rigidly secured. The downward movement of the plunger 40 is limited by a supporting and guiding bearing 44.

Mounted upon the body 10 at one side thereof and directly under the plunger 40, a cartridge 45 containing a compressed asphyxiating gas is provided. The cartridge 45, as shown in Fig. 7, is supported by a vertically extending delivery tube 46, which is preferably mounted within an expansion chamber 47, which, however, is not requisite to the invention. As shown in Figs. 1, 3 and 4, it will be seen that the upper end of the cartridge 45 is directly under the plunger 40, the arrangement being such that when the plunger is released, the spring 41 will urge the same downwardly and its lower extremity will strike the top of the cartridge 45, forcing it downwardly whereby the tube 46 will penetrate the cartridge and the gases of the cartridge will be permitted to escape through the tube 46, and, if desired, through the expansion chamber 47 and through a delivery tube 48, which discharges the gases to a point directly over the animal's head, as shown in Fig. 4. It will be understood that various types of asphyxiating gases may be employed. If desired, a poisonous gas may be used, or a neutral gas which will dispatch the animal by suffocation. It will further be understood that the invention contemplates the use of an anæsthetic gas by means of which insensibility will be produced in the animal and thus provide his capture alive.

It will be understood that if desired the expansion chamber 47 may be utilized in connection with a solid or liquid medium which will volatilize into asphyxiating gas. Thus the invention is not confined to the specific gas cartridge 45 nor to the specific type of chamber 47, it being understood that the device is adapted for use with liquid or solid mediums as above mentioned.

In the present form of the invention, only a single gas cartridge and operating means therefor have been illustrated. It will be understood that if desired two or more such devices may be provided. In the case of two, they may be positioned on either side of the body, whereby a clear vision through the center of the body will not be obstructed.

For resetting the plunger 40, the upper end of the plunger extends through the housing 42 to an external housing 49, which is provided with a removable cap 50, the upper end of the plunger being provided with a gripping handle 51. Thus when it is desired to set the trap, the cap 50 is removed and the handle 51 pulled upwardly to elevate the plunger 40 against the tension of the spring 41, in which elevated position the pawl 38 may be positioned under the flange 39 and the locking member 35 arranged to secure the dog in the position shown in Fig. 1.

From the foregoing it will readily be seen that the present invention provides novel and improved means for the humane capture either dead or alive, of animals, and for the capture of fur-bearing animals without injury to their skins.

Throughout the specification the terms asphyxiating and asphyxiating gas have been used. It is understood that by the use of these terms the applicant contemplates the use of either a poisonous gas or an anæsthetic gas which will not kill but which will produce temporary insensibility. The term asphyxiating gas also contemplates the use of a neutral gas which will fill the chamber and prevent the animal from securing oxygen. It is also obvious that the invention may contemplate the use of a chemical which will absorb oxygen and by chemical action remove oxygen from the atmosphere of the chamber, thus preventing oxygen from reaching the animal. It will be thus seen that the invention is applicable for use with various kinds of chemicals.

It will be understood that the drawings and specification disclose only one form of the present invention and that numerous changes and modifications and the full use of equivalents may be resorted to without departing from the spirit or scope of the invention as outlined in the appended claims.

What is claimed is:

1. A device of the character described, including a body, a bait holder within said body, means operable upon movement of said bait holder to discharge asphyxiating gas within said body, and means simultaneously operable for hermetically sealing said body.

2. A device of the character described, including a body, a bait holder within said body, means operable upon movement of said bait holder to discharge asphyxiating gas within said body, and means simultaneously operable for hermetically sealing said body, said second-mentioned means including means for retaining an animal's head within said body.

3. A device of the character described, including a body, a bait holder within said body, means operable upon movement of said bait holder to discharge asphyxiating gas within said body, and means simultaneously operable for hermetically sealing said body, said second-mentioned means including means for retaining an animal's head within said body, said retaining means comprising a movable yoke adapted to engage the upper side of the animal's neck.

4. A device of the character described, including a body, a bait holder within said body, means operable upon movement of said bait holder to discharge asphyxiating gas within said body, means simultaneously operable for hermetically sealing said body, said second-mentioned means including means for retaining an animal's head within said body, said retaining means comprising a movable yoke adapted to engage the upper side of the animal's neck, and a conical member within said body for engaging the jaws of the animal's head.

5. A device of the character described, including a body, a bait holder within said body, means operable upon movement of said bait holder to discharge asphyxiating gas within said body, means simultaneously operable for hermetically sealing said body, said second-mentioned means including means for retaining an animal's head within said body, said retaining means comprising a movable yoke adapted to engage the upper side of the animal's neck, and a conical member within said body for engaging the jaws of the animal's head, said means for hermetically sealing the body including a gas-tight curtain movable with said yoke to surround the neck of the animal.

6. A device of the character described, including a body, a bait holder within said body, means operable upon movement of said bait holder to discharge asphyxiating gas within said body, means simultaneously operable for hermetically sealing said body, said second-mentioned means including means for retaining an animal's head within said body, said retaining means comprising a movable yoke adapted to engage the upper side of the animal's neck, and a conical member within said body for engaging the jaws of the animal's head, said means for hermetically sealing the body including a gas-tight curtain movable with said yoke to surround the neck of the animal, said first-mentioned means including a plunger movable to discharge gas into said body.

7. A device of the character described, including a body, a bait holder within said body, means operable upon movement of said bait holder to discharge asphyxiating gas within said body, means simultaneously operable for hermetically sealing said body, said second-mentioned means including means for retaining an animal's head within said body, said retaining means comprising a movable yoke adapted to engage the upper side of the animal's neck, a conical member within said body for engaging the jaws of the animal's head, said means for hermetically sealing the body including a gas-tight curtain movable with said yoke to surround the neck of the animal, said first-mentioned means including a plunger movable to discharge gas into said body, and a gas chamber movable by said plunger to be penetrated to permit the escape of gas therefrom.

8. In a device of the character described, a body, including a bait holder, a rear transparent wall, a front wall adapted to be moved by movement of said bait holder, a pair of longitudinally extending arms releasable by movement of said bait holder, a yoke carried by the forward end of said arms adapted to engage an animal upon downward movement of said arms, and a hermetically sealing curtain carried by said yoke.

9. In a device of the character described, a body, including a bait holder, a rear transparent wall, a front wall adapted to be moved by movement of said bait holder, a pair of longitudinally extending arms releasable by movement of said bait holder, a yoke carried by the forward end of said arms adapted to engage an animal upon downward movement of said arms, a hermetically sealing curtain carried by said yoke, and a plunger releasable by movement of said arms to discharge gas within said body.

10. In a device of the character described, a body, including a bait holder, a rear transparent wall, a front wall adapted to be moved by movement of said bait holder, a pair of longitudinally extending arms releasable by movement of said bait holder, a yoke carried by the forward end of said arms adapted to engage an animal upon downward movement of said arms, a hermetically sealing curtain carried by said yoke, a plunger releasable by movement of said arms to discharge gas within said body, a flange on said plunger, and a pawl carried by said yoke for engaging said flange when the trap is in set position.

11. In a device of the character described, a body, including a bait holder, a rear transparent wall, a front wall adapted to be moved by movement of said bait holder, a pair of longitudinally extending arms releasable by movement of said bait holder, a yoke carried by the forward end of said arms adapted to engage an animal upon downward movement of said arms, a hermetically sealing curtain carried by said yoke, a plunger releasable by movement of said arms to discharge gas within said body, a flange on said plunger, a pawl carried by said yoke for engaging said flange when the trap is in set position, and means carried by said bait holder for releasing said pawl upon movement of said bait holder.

WALTER J. LEMENTY.